US00RE46330E

(19) United States
(12) Reissued Patent
Hsu et al.

(10) Patent Number: US RE46,330 E
(45) Date of Reissued Patent: Feb. 28, 2017

(54) DRIVING APPARATUS OF LIGHT EMITTING DIODE AND DRIVING METHOD THEREOF

(71) Applicant: Novatek Microelectronics Corp., Hsinchu (TW)

(72) Inventors: Kuo-Ching Hsu, Hsinchu (TW); Chin-Hsun Hsu, New Taipei (TW); Tsung-Hau Chang, Hsinchu (TW); Ting-Wei Liao, New Taipei (TW)

(73) Assignee: Novatek Microelectronics Corp., Hsinchu (TW)

(21) Appl. No.: 14/693,890

(22) Filed: Apr. 23, 2015

Related U.S. Patent Documents

Reissue of:
(64) Patent No.: 8,427,081
Issued: Apr. 23, 2013
Appl. No.: 13/556,146
Filed: Jul. 23, 2012

U.S. Applications:
(63) Continuation of application No. 13/370,310, filed on Feb. 10, 2012, now Pat. No. 8,288,969, which is a (Continued)

(30) Foreign Application Priority Data

Sep. 16, 2009 (TW) ..... 98131241 A

(51) Int. Cl.
*H05B 37/02* (2006.01)
*H05B 33/08* (2006.01)

(52) U.S. Cl.
CPC ..... *H05B 33/0827* (2013.01); *H05B 33/0818* (2013.01)

(58) Field of Classification Search
CPC ..... H05B 33/0827; H05B 33/0818
(Continued)

(56) References Cited

U.S. PATENT DOCUMENTS 7,368,977 B2 * 5/2008 Wei et al. ..... 327/536
7,560,677 B2 * 7/2009 Lyons et al. ..... F21K 9/54 250/205
(Continued)

FOREIGN PATENT DOCUMENTS

CN 1515037 7/2004
CN 1790127 6/2006
(Continued)

OTHER PUBLICATIONS

"First Office Action of China Counterpart Application", issued on Dec. 10, 2012, p. 1-p. 7, in which the listed references were cited.

*Primary Examiner* — Minh T Nguyen
(74) *Attorney, Agent, or Firm* — Jianq Chyun IP Office

(57) ABSTRACT

A driving method of a light-emitting diode (LED) adapted to a driving apparatus is provided. The driving method includes detecting whether the driving apparatus performs dimming, and if the driving apparatus performs dimming, determining whether a predetermined requirement for dimming control is met or not. When the predetermined requirement for dimming control is not met, respective current magnitudes of a plurality of driving currents are regulated, and each of the driving currents is output for a full time of a period. Conversely, when the predetermined requirement for dimming control is met, each of the driving currents is output for a partial time of a period.

22 Claims, 11 Drawing Sheets

Related U.S. Application Data continuation of application No. 12/628,233, filed on Dec. 1, 2009, now Pat. No. 8,154,223.

(58) Field of Classification Search

USPC ..... 315/291, 294, 297, 169.1, 185 R, 307, 315/360, 312, 287; 345/46, 82, 63, 204, 345/211, 212, 207, 690, 691

See application file for complete search history.

(56) References Cited

U.S. PATENT DOCUMENTS

| | | | | |
|---|---|---|---|---|
| 7,659,873 | B2 * | 2/2010 | Nakao et al. | 345/82 |
| 7,719,209 | B2 * | 5/2010 | Hayes | 315/308 |
| 7,759,881 | B1 * | 7/2010 | Melanson | 315/307 |
| 7,764,028 | B2 * | 7/2010 | Mariyama et al. | 315/360 |
| 7,855,520 | B2 * | 12/2010 | Leng | 315/307 |
| 7,863,831 | B2 * | 1/2011 | Vos | H05B 33/0827 315/155 |
| RE42,161 | E * | 2/2011 | Hochstein | 363/89 |
| 7,999,484 | B2 * | 8/2011 | Jurngwirth et al. | 315/247 |
| 8,076,867 | B2 * | 12/2011 | Kuo et al. | 315/291 |
| 8,115,419 | B2 * | 2/2012 | Given et al. | 315/307 |
| 8,134,304 | B2 * | 3/2012 | Hsu et al. | 315/291 |
| 8,154,223 | B2 * | 4/2012 | Hsu et al. | 315/360 |
| 8,288,969 | B2 * | 10/2012 | Hsu et al. | 315/360 |
| 2007/0195552 | A1 | 8/2007 | Park | |
| 2009/0225020 | A1 | 9/2009 | Ran et al. | |
| 2009/0322235 | A1 * | 12/2009 | Shiu et al. | 315/185 R |
| 2010/0148679 | A1 * | 6/2010 | Chen et al. | 315/185 R |

FOREIGN PATENT DOCUMENTS

| | | |
|---|---|---|
| CN | 101122697 | 2/2008 |
| CN | 101179883 | 5/2008 |
| CN | 101312001 | 11/2008 |
| JP | 2007042758 | 2/2007 |
| JP | 2008210537 | 9/2008 |
| TW | 200814857 | 3/2008 |
| TW | 200820826 | 5/2008 |
| TW | 200842781 | 11/2008 |

* cited by examiner

DRIVING APPARATUS OF LIGHT EMITTING DIODE AND DRIVING METHOD THEREOF

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application is a *Reissue Application of U.S. Pat. No. 8,427,081, issued on Apr. 23, 2013, application Ser. No. 13/556,146, filed on Jul. 23, 2012. The prior application Ser. No. 13/556,146 is a* continuation application [of and claims the priority benefit] of U.S. application Ser. No. 13/370,310, filed on Feb. 10, 2012, now U.S. Pat No. 8,288,969. The prior application Ser. No. 13/370,310[, filed on Feb. 10, 2012,] is a continuation application of U.S. patent application Ser. No. 12/628,233 filed on Dec. 1, 2009, *now* U.S. Pat. No. 8,154,223. The prior application Ser. No. 12/628,233 claims the benefit of Taiwan patent application serial no. 98131241 filed on Sep. 16, 2009. The entirety of each of the above-mentioned patent applications is hereby incorporated by reference herein and made a part of this specification.

BACKGROUND OF THE INVENTION

1. Field of the Invention

The present invention relates to a driving method. More particularly, the present invention relates to a driving apparatus of a light-emitting diode and a driving method thereof.

2. Description of Related Art

Light emitting diodes (LEDs) have advantages of small size, power-saving and high durability, and as fabrication processes thereof become mature, price of the LEDs decreases. Therefore, it is popular to use the LEDs as light source products. Moreover, since the LED has features of low-operating voltage (only 1.5-3V), initiative light-emitting, and having a certain brightness, wherein the brightness can be adjusted by voltage or current, and has features of impact resistance, anti-vibration and long lifespan (100,000 hours), the LED is widely used to various terminal equipments, such as vehicle headlamps, traffic lights, text displays, billboards and large screen video displays, and domains such as general level architectural lighting and liquid crystal display (LCD) backlight, etc.

Regarding a driving circuit of the LED, a commonly used dimming method thereof is to regulate a duty cycle of a pulse according to a pulse-width modulation (PWM) technique, so as to regulate an equivalent current output to the LED by an output stage to adjust a brightness of the LED. However, when the PWM technique is used for dimming, a current switching operation of the output stage is the same as that of a switch. The current switching operation lead to a great load variation of a voltage of the output stage, so that the voltage may have an excessive ripple. Meanwhile, the excessive ripple can cause a great magnetic field variation of an inductor in the circuit, and a capacitor in the circuit can be sharply vibrated to generate a shape-changing due to an excessive transient voltage variation, so that an audio noise is generated.

FIG. 1A is a system schematic diagram illustrating a conventional driving circuit of an LED. Referring to FIG. 1A, the driving circuit 100 includes a voltage converter 110, a conversion loop controller 120, an amplifier 130, a voltage selector 140 and a current driving unit 150 formed by a plurality of current driving devices. The voltage converter 110 receives a power voltage $V_{DD}$, and generates an operating voltage $V_{CC}$ with a level different to that of the power voltage $V_{DD}$ according to an output of the conversion loop controller 120. A positive input terminal of the amplifier 130 receives a reference voltage Vref, and a negative input terminal thereof receives an output voltage of the voltage selector 140, so that the amplifier 130 accordingly outputs a voltage to control the conversion loop controller 120, wherein the reference voltage Vref is a fixed value. The voltage selector 140 selects and outputs a voltage of a negative terminal of one of LED strings 50_1-50_n. Positive terminals of the LED strings 50_1-50_n receive the operating voltage $V_{CC}$, and the negative terminals of the LED strings 50_1-50_n are respectively coupled to the current driving unit 150 through switches S1-Sn. The LED strings 50_1-50_n are driven by load currents and the switches are switched according to a dimming signal, so as to implement a dimming operation.

FIG. 1B is a timing diagram of the driving currents of FIG. 1A. Referring to FIG. 1A and FIG. 1B, in the LED driving circuit 100, the PWM technique is generally used to regulate a time $t_1$ for supplying the load currents so as to adjust the brightness of the LED. In other words, in a fixed period T, the longer the time $t_1$ is, the higher the brightness of the LED is. Conversely, the shorter the time $t_1$ is, the lower the brightness of the LED is. However, when the PWM technique is used for dimming, switching operations of the switches S1-Sn lead to a variation of the load currents and the variation of the load currents can lead to a great load variation of the operating voltage $V_{CC}$, so that the operating voltage $V_{CC}$ output by the voltage converter 110 may have an excessive ripple. Meanwhile, an input current of the voltage converter 100 may also have a great transient variation, which may not only cause a great magnetic field variation of an inductor in the voltage converter 100, but also a regulation capacitor in the voltage converter 100 can be sharply vibrated to generate a shape-changing due to an excessive transient voltage variation, so that the audio noise is generated. Moreover, regarding the driving circuit 100, during the dimming, the switches S1-Sn are simultaneously switched to switch the load currents $i_1$-$i_n$, though the current switching operation can cause a severe electromagnetic interference (EMI).

SUMMARY OF THE INVENTION

The present invention is directed to a driving apparatus of a light-emitting diode (LED) and a driving method thereof, which can suppress an audio noise and an electromagnetic interference (EMI).

The present invention provides a driving method of an LED, which is adapted to a driving apparatus. The driving method includes following steps. First, whether the driving apparatus performs dimming is detected. Next, when the driving apparatus is detected to perform dimming, determining whether a predetermined requirement for dimming control is met or not. When the predetermined requirement for dimming control is not met, respective current magnitudes of a plurality of driving currents are regulated, and each of the driving currents is output for a full time of a period. When the predetermined requirement for dimming control is met, each of the driving currents is output for a partial time of a period.

The present invention provides a driving method of an LED, which is adapted to a driving apparatus. The driving apparatus receives a dimming signal. The driving method includes following steps. First, it is detected whether the driving apparatus performs dimming. Next, when the driving apparatus is detected to perform the dimming, regulating at least one of a respective current magnitude and a respective outputting time of each of a plurality of driving currents in a period according to a duty cycle of the dimming signal, such that a sum of the driving currents calculated for a period is substantially proportional to the duty cycle of the dimming signal The present invention provides a driving circuit for driving a plurality of LEDs. The driving circuit includes a plurality of switches, a dimming detector and a current control unit. The switches are respectively coupled to the LEDs. The dimming detector receives a dimming signal, and detects whether the driving apparatus performs dimming according to the dimming signal, so as to output a dimming mode signal according to the dimming signal. The current control unit outputs a plurality of control signals according to the dimming mode signal and the dimming signal, and the control signals respectively control conducting states of the switches.

The present invention provides an electronic device that includes said driving circuit and a plurality of LEDs coupled to and driven by the driving circuit.

According to the driving apparatus of the LED of the present invention and the driving method thereof, when the driving apparatus performs the dimming and the duty cycle of the dimming signal is smaller than the predetermined value, the outputting time of the driving currents are equally allotted in a period, and the current magnitude of each of the driving currents is correspondingly regulated. When the driving apparatus performs the dimming and the duty cycle of the dimming signal is equal to or greater than the predetermined value, the driving currents are simultaneously output in the period, and the current magnitude of each of the driving currents is regulated according to the dimming signal. By such means, the audio noise and the EMI caused by excessive variation of a sum of the driving currents are suppressed.

In order to make the aforementioned and other features and advantages of the present invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
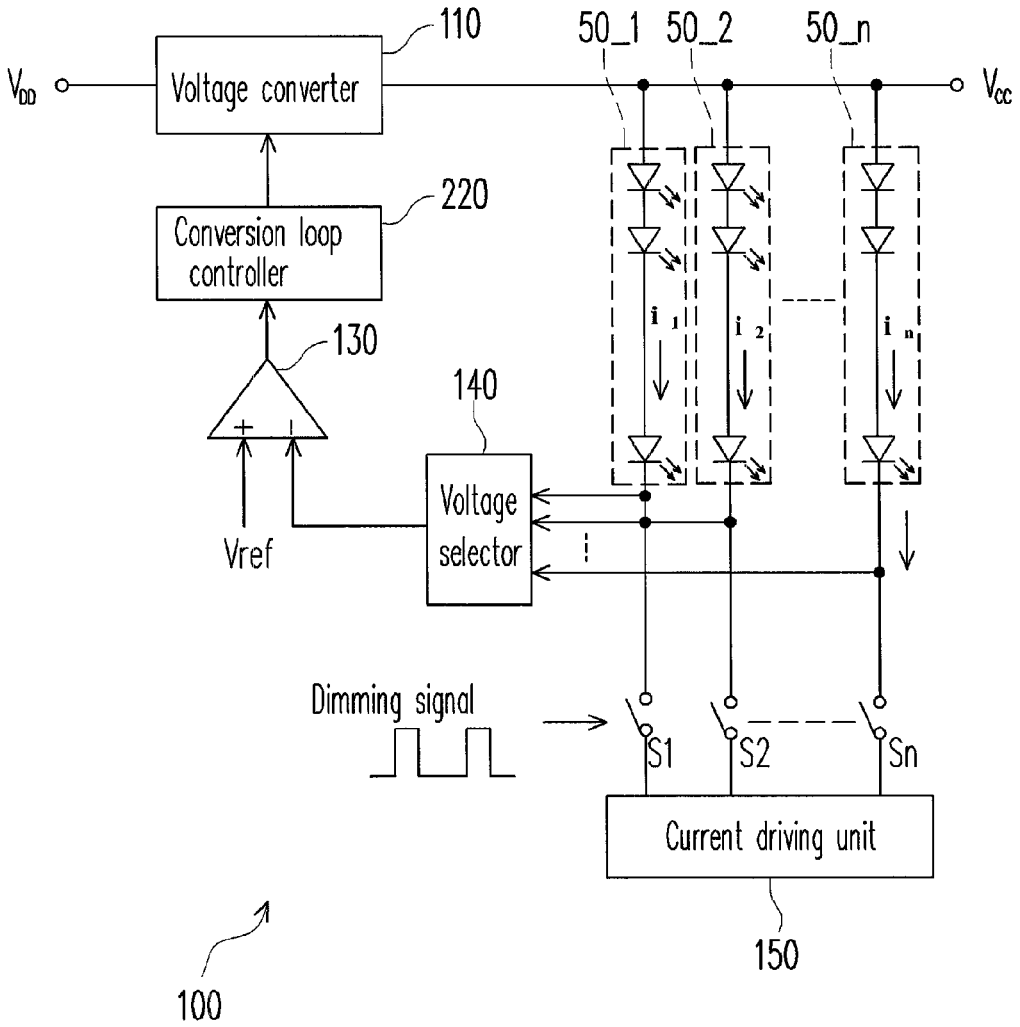
FIG. 1A (RELATED ART)
FIG. 1A is a system schematic diagram illustrating a conventional driving circuit of an LED.
Figure 1B:
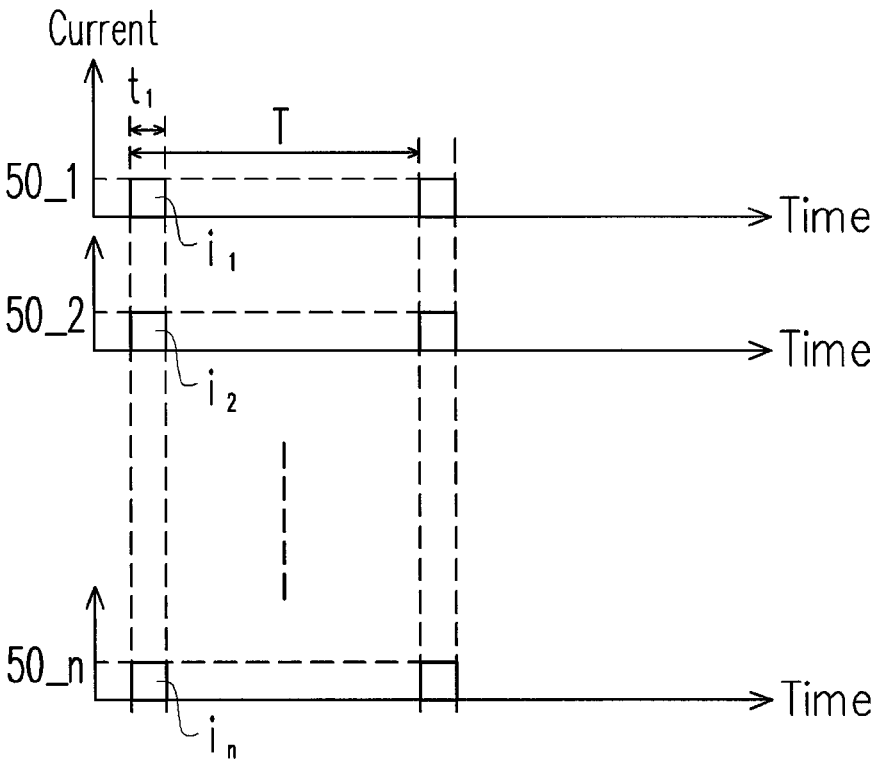
FIG. 1B (RELATED ART)
FIG. 1B is a timing diagram of driving currents of FIG. 1A.

Reference will now be made in detail to the present preferred embodiments of the invention, examples of which are illustrated in the accompanying drawings. Wherever possible, the same reference numbers are used in the drawings and the description to refer to the same or like parts.

Figure 2A:
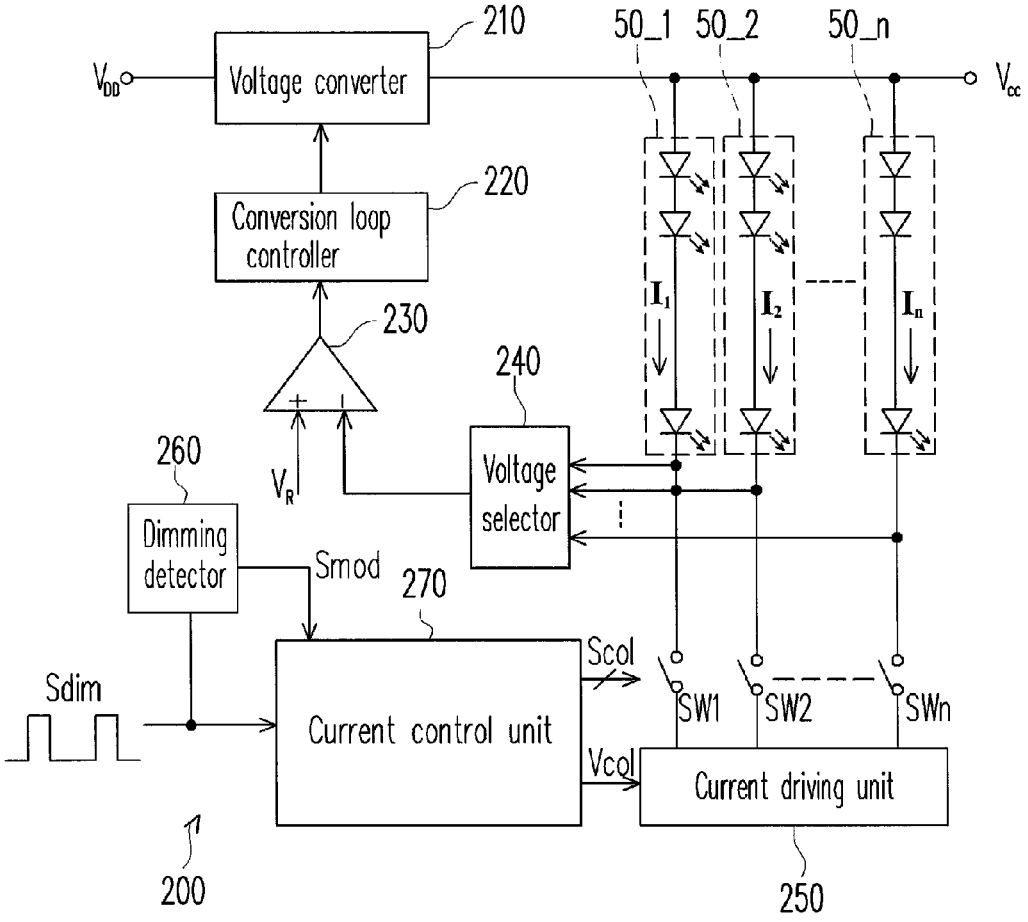
FIG. 2A is a schematic diagram illustrating a driving circuit according to an embodiment of the present invention.

FIG. 2A is a schematic diagram illustrating a driving circuit according to an embodiment of the present invention. Referring to FIG. 2A, the driving circuit 200 includes a voltage converter 210, a conversion loop controller 220, an amplifier 230, a voltage selector 240, a current driving unit 250, a dimming detector 260, a current control unit 270 and switches SW1-SWn. The dimming detector 260 receives a dimming signal Sdim, and detects whether the driving apparatus 200 performs dimming according to the dimming signal Sdim, so as to output a dimming mode signal Smod. The current control unit 270 outputs a plurality of control signals Sco1 and a control voltage Vco1 according to the dimming mode signal Smod and the dimming signal Sdim. The control signals Sco1 respectively control a conducting state of each of the switches SW1-SWn, and the control voltage Vco1 controls the current driving unit 250 to regulate current magnitudes of driving currents $I_1$-$I_n$.

The voltage converter 210 receives a power voltage $V_{DD}$, and generates an operating voltage $V_{CC}$ with a level different to that of the power voltage $V_{DD}$ according to an adjusting signal output from the conversion loop controller 220. The conversion loop controller 220 generates the adjusting signal according to a received voltage. A positive input terminal of the amplifier 230 receives a reference voltage $V_R$, and a negative input terminal thereof receives a voltage output from the voltage selector 240, so that the amplifier 230 accordingly outputs a voltage to the conversion loop controller 220, wherein the reference voltage $V_R$ can be a fixed value. The voltage selector 240 selects and outputs a voltage of a negative terminal of one of light-emitting diode (LED) strings 50_1-50_n. Positive terminals of the LED strings 50_1-50_n receive the operating voltage $V_{CC}$, and the negative terminals of the LED strings 50_1-50_n are respectively coupled to the current driving unit 250 through the switches SW1-SWn. The LED strings 50_1-50_n are driven by the driving currents $i_1$-$i_n$.

When a duty cycle of the dimming signal Sdim is 100%, it represents that the driving apparatus does not perform the dimming. Now, the current control unit 270 generates the control signals Sco1 according to the dimming mode signal Smod, so as to control the switches to be simultaneously conducted in a period, and control the current driving unit 250 to regulate a current magnitude D of each of the driving currents $I_1$-$I_n$ to a current upper limit according to the control voltage Vco1. When the duty cycle of the dimming signal Sdim is not 100%, it represents that the driving apparatus performs the dimming. Now, the current control unit 270 also generates the control signals Sco1 according to the dimming mode signal Smod, so as to control conducting time of the switches SW1-SWn to be equivalent in a period, and control the current driving unit 250 to regulate the current magnitudes of the driving currents $I_1$-$I_n$ according to the control voltage Vco1, wherein the current driving unit 250 can be formed by a plurality of voltage-controlled current sources, so as to simultaneously regulate the current magnitudes of the driving currents $I_1$-$I_n$ according to the control voltage Vco1. It should be noticed that a relationship between the duty cycle of the dimming signal Sdim and whether the driving apparatus 200 performs the dimming is only used as an example, which can be modified according to an actual requirement.

Figure 2B:
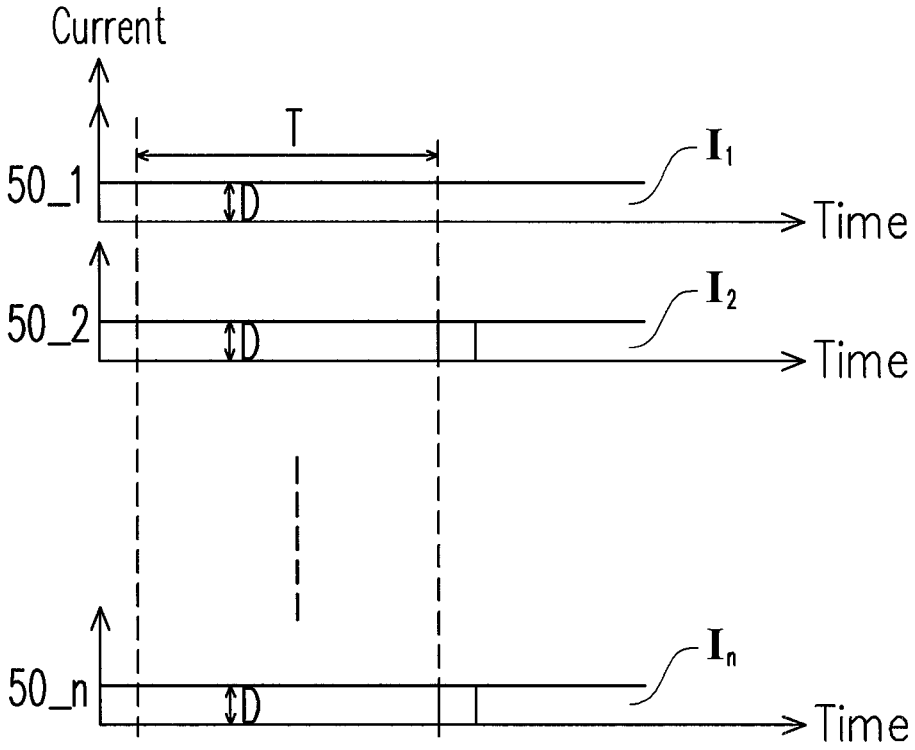
FIG. 2B is a current waveform diagram of LED strings of FIG. 2A.

The dimming operation of the driving apparatus 200 is further described below. FIG. 2B is a current waveform diagram of the LED strings of FIG. 2A. Referring to FIG. 2A and FIG. 2B, when the driving apparatus 200 performs the dimming and the duty cycle of the dimming signal Sdim is greater than or equal to a predetermined value, the current control unit 270 generates a plurality of the control signals Sco1 and the control voltage Vco1 according to the dimming mode signal Smod and the dimming signal Sdim. The control signals Sco1 control the switches SW1-SWn to be simultaneously conducted in a period T, so as to simultaneously provide the driving currents $I_1$-$I_n$ to the LED strings 50_1-50_n. The currents on the LED strings 50_1-50_n present a direct current (DC) state rather than a pulse state due to that the switches SW1-SWn are maintained conducted. Moreover, the current driving unit 250 regulates the current magnitude D of each of the driving currents $I_1$-$I_n$ according to the control voltage Vco1, wherein the current magnitude D relates to the duty cycle of the dimming signal Sdim, for example, if the duty cycle is 1/8, the current magnitude D is equal to 1/8 of the current upper limit. The predetermined value can be a ratio between the period T and a number n of the driving currents $I_1$-$I_n$, for example, if the number n of the driving currents is 8, the predetermined value is then 1/8 of the period (i.e. T/8).

Figure 2C:
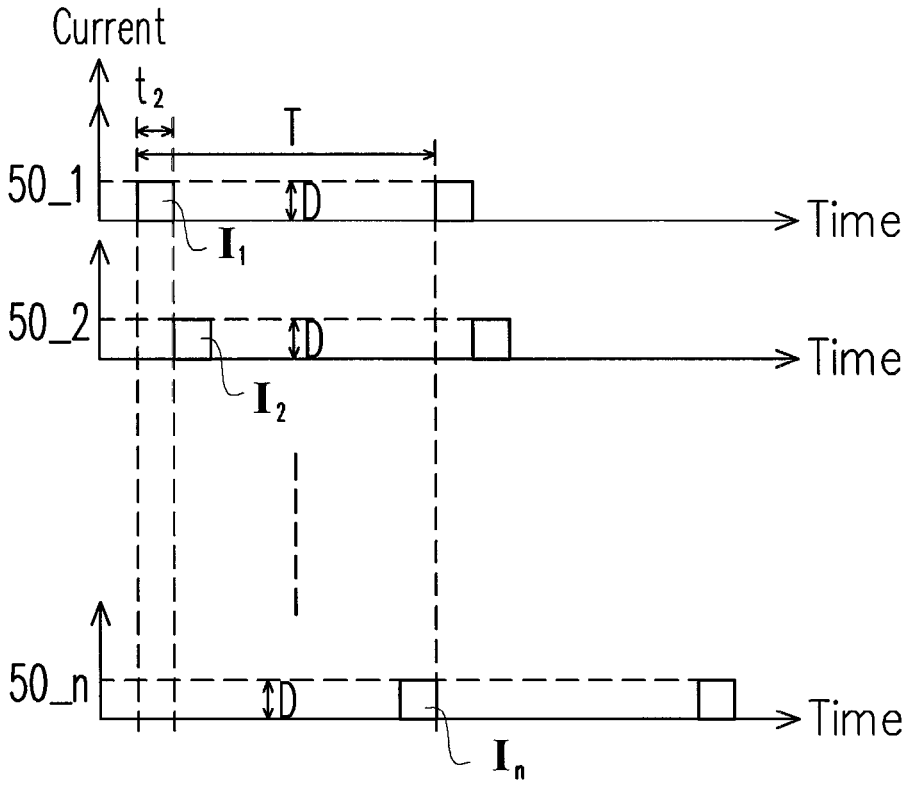
FIG. 2C is another current waveform diagram of LED strings of FIG. 2A.

FIG. 2C is another current waveform diagram of the LED strings of FIG. 2A. Referring to FIG. 2A and FIG. 2C, when the driving apparatus 200 performs the dimming and the duty cycle of the dimming signal Sdim is smaller than the predetermined value, the current control unit 270 also generates a plurality of the control signals Sco1 and the control voltage Vco1 according to the dimming mode signal Smod and the dimming signal Sdim. The control signals Sco1 control conducting time $t_2$ of each of the switches SW1-SWn to be equivalent in the period T, so as to respectively output the driving currents $I_1$-$I_n$ to the LED strings 50_1-50_n. For example, if a number of the switches is 8, the conducting time $t_2$ is then 1/8 of the period T. The current driving unit 250 regulates the current magnitude D of each of the driving currents according to the control voltage Vco1, wherein the current magnitude D relates to the duty cycle of the dimming signal Sdim and the predetermined value, for example, if the duty cycle is 1/16, the current magnitude D is equal to 1/2 of the current upper limit, i.e. equal to the duty cycle (i.e. 1/16) divided by the predetermined value (i.e. 1/8) times the current upper limit The driving currents $I_1$-$I_n$ can be sequentially output in turn or can be output in turn according to a random sequence.

Accordingly, regardless of the switches SW1-SWn being simultaneously or respectively conducted during the period T according to the duty cycle of the dimming signal Sdim, a sum of the driving currents $I_1$-$I_n$ is approximately maintained to a fixed value, which can greatly reduce or even eliminate a load variation of the operating voltage $V_{CC}$, so as to suppress an audio noise and an electromagnetic interference (EMI).

Figure 2D:
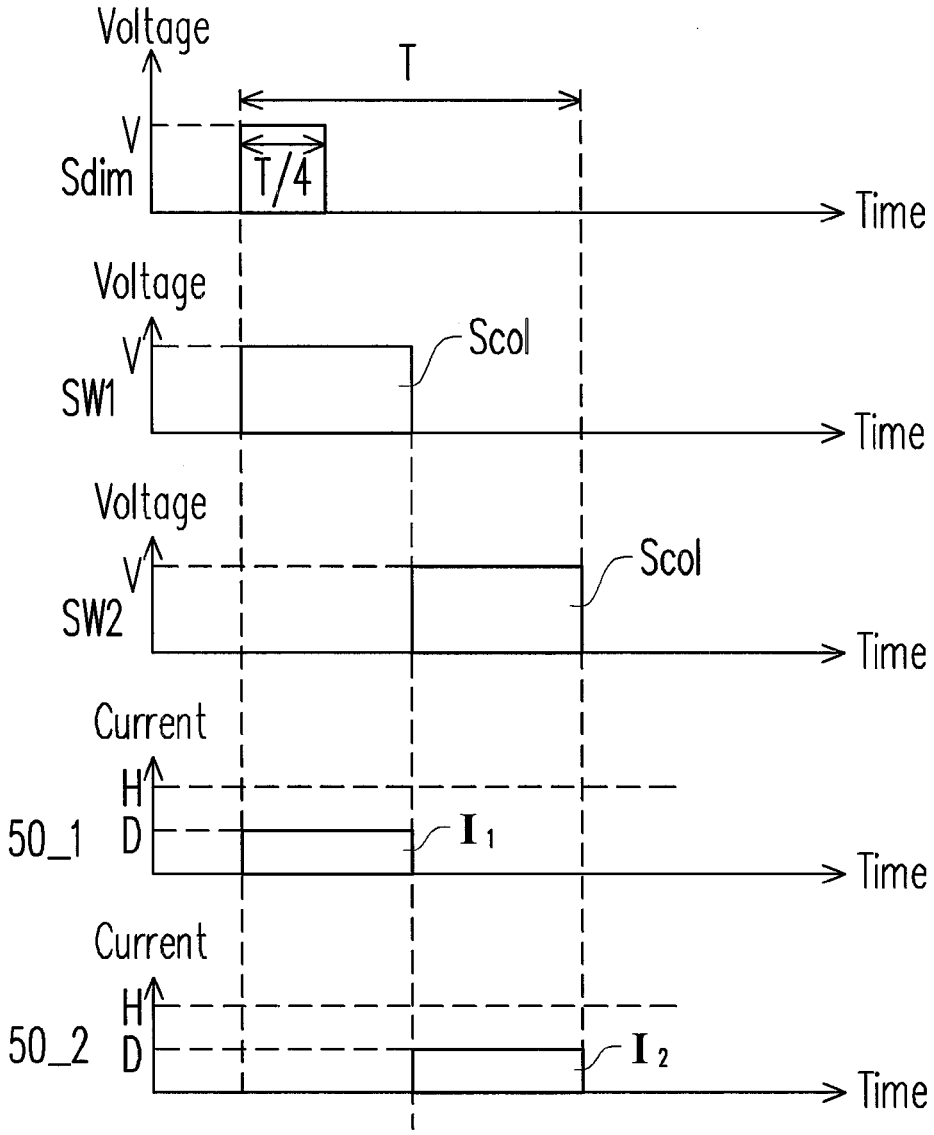
FIG. 2D is a waveform diagram of a driving apparatus and LED strings of FIG. 2A.

FIG. 2D is a waveform diagram of the driving apparatus and the LED strings of FIG. 2A. Referring to FIG. 2A and FIG. 2D, in the present embodiment, assuming the driving apparatus 200 only drives the LED strings 50_1 and 50_2, and the duty cycle of the received dimming signal Sdim is 1/4. Now, the switches SW1 and SW2 are respectively conducted according to the received control signals Sco1, and the conducting time thereof is respectively T/2. Moreover, the current driving unit 250 regulates the current magnitude D of each of the driving currents $I_1$-$I_n$ to a half (i.e. 1/2) of a current upper limit H according to the control voltage Vco1, wherein the current upper limit H corresponds to a high level V of the voltage signal. Accordingly, the driving apparatus 200 can implement a 1/4 dimming effect, and the current magnitude D is approximately maintained to a half of the current upper limit H, so as to suppress the audio noise and the EMI.

Figure 2E:
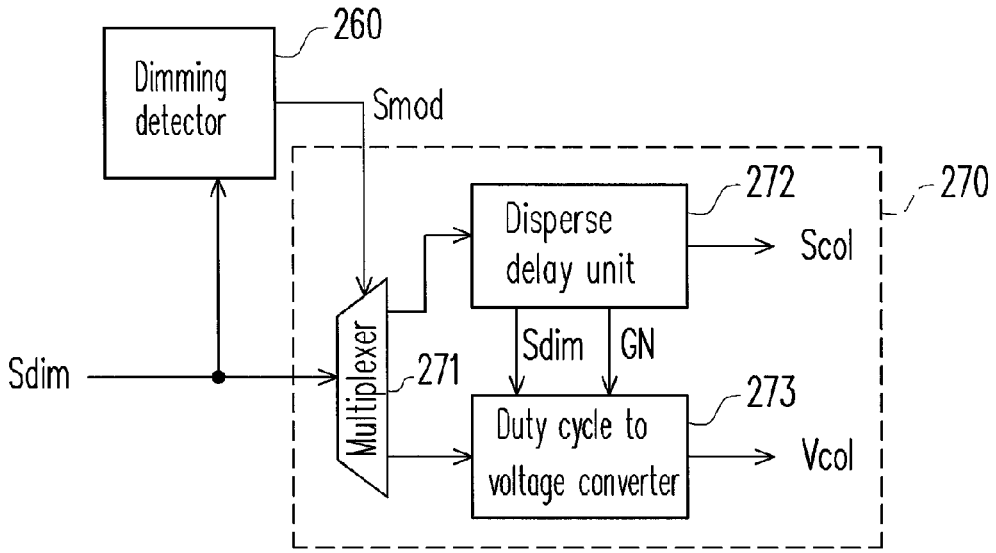
FIG. 2E is a schematic diagram illustrating a current control unit and a dimming detector of FIG. 2A.

FIG. 2E is a schematic diagram illustrating the current control unit and the dimming detector of FIG. 2A. Referring to FIG. 2E, in the present embodiment, the current control unit 270 includes a multiplexer 271, a disperse delay unit 272 and a duty cycle to voltage converter 273. When the driving apparatus 200 performs the dimming and the duty cycle of the dimming signal Sdim is greater than or equal to the predetermined value, under a control of the dimming mode signal Smod output from the dimming detector 260, a first output terminal of the multiplexer 271 outputs the dimming signal Sdim received by an input terminal thereof to the duty cycle to voltage converter 273, so as to regulate a magnitude of the control voltage Vco1 according to the duty cycle of the dimming signal Sdim. The current driving unit 250 synchronously regulates the current magnitudes of the driving currents $I_1$-$I_n$ according to a magnitude of the control voltage Vco1. Meanwhile, since the disperse delay unit 272 does not receive the dimming signal Sdim, the control signals of the disperse delay unit 272 control the switches SW1-SWn to be simultaneously conducted, so as to simultaneously output the driving currents $I_1$-$I_n$ to the LED strings 50_1-50_n.

When the driving apparatus 200 performs the dimming and the duty cycle of the dimming signal Sdim is smaller than the predetermined value, under a control of the dimming mode signal Smod output from the dimming detector 260, a second output terminal of the multiplexer 271 outputs the dimming signal Sdim received by the input terminal thereof to the disperse delay unit 272. After the disperse delay unit 272 receives the dimming signal Sdim, the controls signals Sco1 generated by the disperse delay unit 272 control the switches SW1-SWn to be respectively conducted during the period, wherein the conducting time of each of the switches SW1-SWn is identical. Generally, the control signals Sco1 can separately transmit pulses to conduct the switches SW1-SWn at different time sections. The conducting time of the switches SW1-SWn are separated and consecutive, i.e. the pulses used for conducting the switches are consecutively output from the corresponding output terminals of the control signals Sco1, and a consecutive output effect thereof is equivalent to a pulse shifting effect. Wherein, the pulse shifting effect can be implemented by shift registers, namely, the function that the control signals Sco1 transmit the pulses at different time sections can be implemented by shifting and outputting the pulses through a plurality of the shift registers.

Meanwhile, the disperse delay unit 272 transmits the received dimming signal Sdim to the duty cycle to voltage converter 273, and simultaneously outputs a gain signal GN to the duty cycle to voltage converter 273. The duty cycle to voltage converter 273 regulates the magnitude of the control voltage Vco1 according to the duty cycle of the dimming signal Sdim and the gain signal GN, so as to synchronously regulate the magnitudes of the driving currents $I_1$-$I_n$. Wherein, the gain signal GN can transmit a gain, and the gain transmitted by the gain signal GN can be equal to a current number of the driving currents $I_1$-$I_n$. For example, if the current number of the driving currents $I_1$-$I_n$ is 8, the gain transmitted by the gain signal GN is 8. For example, when the duty cycle of the dimming signal Sdim is 1/16, the current magnitude of each of the driving currents should be 1/16 of the current upper limit, though according to the gain signal GN, the current magnitude of each of the driving currents $I_1$-$I_n$ is adjusted to be 1/2 of the current upper limit, and since the outputting time of each of the driving currents $I_1$-$I_n$ is 1/8 of the period, a 1/16 dimming effect can be achieved.

It should be noticed that when the disperse delay unit 272 does not receive the dimming signal Sdim, the disperse delay unit 272 can output the gain signal GN with a gain of 1, or does not output the gain signal GN. Moreover, when the duty cycle to voltage converter 273 does not receive the gain signal GN, it can generate the corresponding control voltage Vco1 according to the duty cycle of the dimming signal Sdim.

Figure 2F:
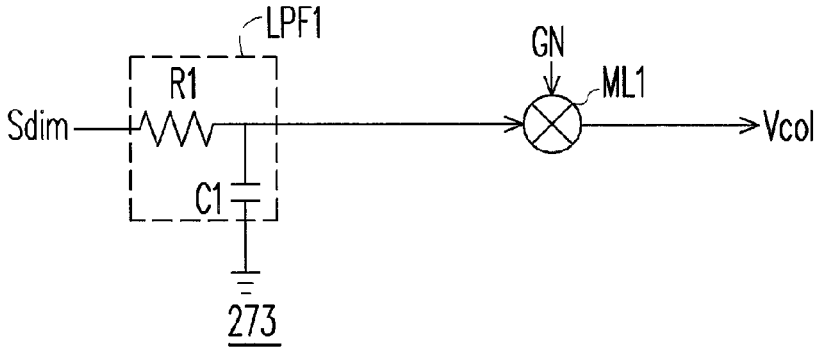
FIG. 2F is a schematic diagram illustrating a duty cycle to voltage converter of FIG. 2E.

FIG. 2F is a schematic diagram illustrating the duty cycle to voltage converter of FIG. 2E. Referring to FIG. 2F, in the present embodiment, the duty cycle to voltage converter 273 includes a low pass filter circuit LPF1 and an analog multiplier ML1, wherein the low pass filter circuit LPF1 can be formed by a resistor R1 and a capacitor C1, though the present invention is not limited thereto. The low pass filter circuit LPF1 can convert the received dimming signal Sdim into a DC level, i.e. the low pass filter circuit LPF1 can output different DC levels according to different duty cycles of the dimming signal Sdim. The analog multiplier ML1 can amplify the DC level output from the low pass filter circuit LPF1 to serve as the control voltage Vco1 according to the gain signal GN. When the gain transmitted by the gain signal GN is 1, a level of the control voltage Vco1 is the same to the DC level output by the low pass filter circuit LPF1. When the gain transmitted by the gain signal GN is 2, the level of the control voltage Vco1 is twice of the DC level output by the low pass filter circuit LPF1, and the others are deduced by analogy.

Figure 2G:
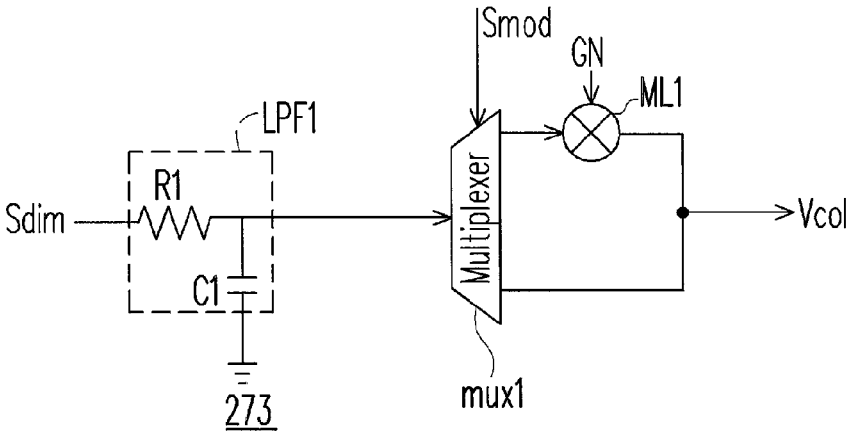
FIG. 2G is another schematic diagram illustrating a duty cycle to voltage converter of FIG. 2E.

FIG. 2G is another schematic diagram illustrating the duty cycle to voltage converter of FIG. 2E. Referring to FIG. 2F and FIG. 2G, a difference there between lies in a multiplexer mux1. The multiplexer mux1 determines whether to transmit the DC level output from the low pass filter circuit LPF1 to the analog multiplier ML1 or directly output the DC level according to the dimming mode signal Smod. In other words, when the driving apparatus 200 performs the dimming, and the duty cycle of the dimming signal Sdim is greater than or equal to the predetermined value, the DC level output by the low pass filter circuit LPF1 is directly output as the control voltage Vco1. When the driving apparatus 200 performs the dimming, and the duty cycle of the dimming signal Sdim is smaller than the predetermined value, the DC level output by the low pass filter circuit LPF1 is transmitted to the analog multiplier ML1, so as to be amplified according to the gain signal GN and output as the control voltage Vco1.

Figure 2H:
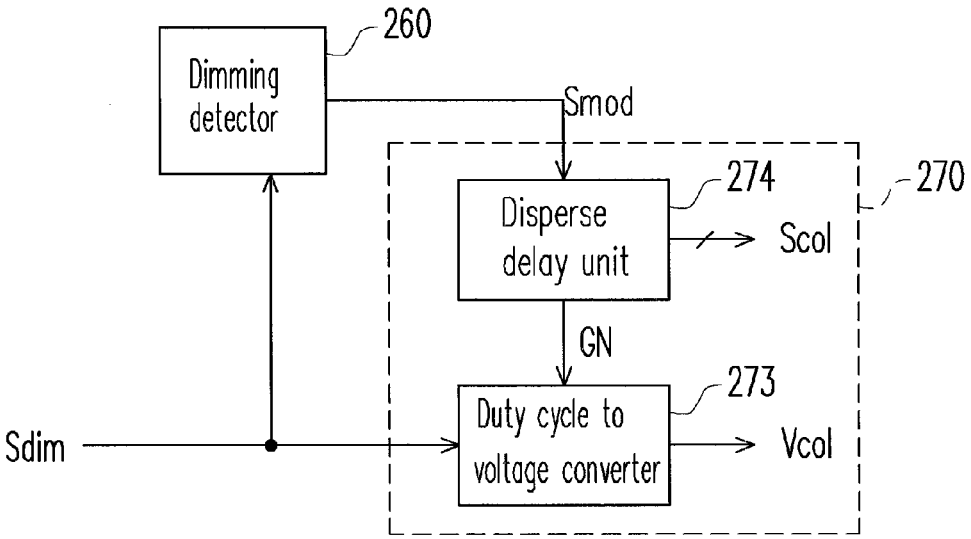
FIG. 2H is another schematic diagram illustrating a current control unit and a dimming detector of FIG. 2A.

FIG. 2H is another schematic diagram illustrating the current control unit and the dimming detector of FIG. 2A. Referring to FIG. 2E and FIG. 2H, differences there between lie in the disperse delay unit 274 and the omitted multiplexer 271. When the driving apparatus 200 performs the dimming, and the duty cycle of the dimming signal Sdim is greater than or equal to the predetermined value, the disperse delay unit 274 generates the control signals Sco1 according to the dimming mode signal Smod, so as to control the switches SW1-SWn to be simultaneously conducted, wherein the disperse delay unit 274 does not output the gain signal GN or outputs the gain signal GN with the gain of 1. In case that the disperse delay unit 274 does not output the gain signal GN, the duty cycle to voltage converter 273 can generate the control voltage Vco1 according to the received dimming signal Sdim. In case that the disperse delay unit 274 outputs the gain signal GN with the gain of 1, the duty cycle to voltage converter 273 can generate the control voltage Vco1 according to the received dimming signal Sdim and the gain signal GN.

When the driving apparatus 200 performs the dimming, and the duty cycle of the dimming signal Sdim is smaller than the predetermined value, the disperse delay unit 274 generates the control signals Sco1 according to the dimming mode signal Smod, so as to control the switches SW1-SWn to be respectively conducted in one period, and the disperse delay unit 274 outputs the gain signal GN corresponding to the current number of the driving currents $I_1$-$I_n$. The duty cycle to voltage converter 273 can generate the control voltage Vco1 according to the received dimming signal Sdim and the gain signal GN.

Figure 2I:
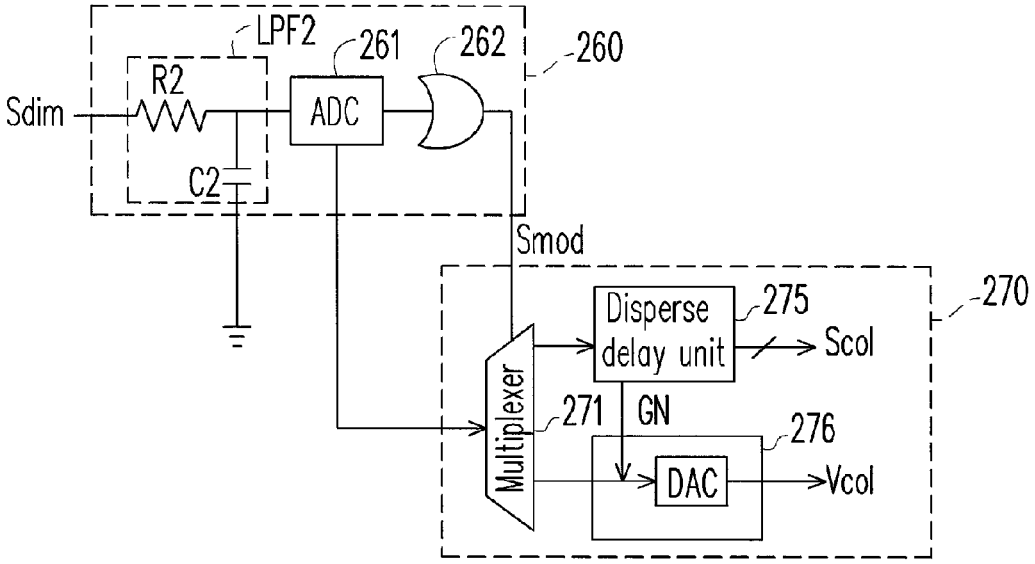
FIG. 2I is still another schematic diagram illustrating a current control unit and a dimming detector of FIG. 2A.

FIG. 2I is still another schematic diagram illustrating the current control unit and the dimming detector of FIG. 2A. Referring to FIG. 2I, the current number of the driving currents $I_1$-$I_n$ is, for example, 8, i.e. the predetermined value is 1/8. The dimming detector 260 includes a low pass filter circuit LPF2, an analog-to-digital converter (ADC) 261 and an OR gate 262, wherein the ADC 261 is, for example, a 4 bits ADC. If the duty cycle of the dimming signal Sdim is 1/4, the ADC 261 outputs "0100", which is "0100 0000" in a digital type. The predetermined value is "0010 0000" in the digital type.

According to the above description, as long as one of the front three highest bits has a value of 1, it is considered to be greater than the predetermined value, so that an OR operation can be performed to the front three highest bits to generate the dimming mode signal Smod. After the OR gate 262 operates the front three highest bits of "0100 0000" output by the ADC 261, the dimming mode signal Smod with a high logic level is generated, which represents that the duty cycle of the dimming signal Sdim is greater than the predetermined value. Thereafter, the multiplexer 271 outputs "0100 0000" transmitted from the ADC 261 to a duty cycle to voltage converter 276 according to the dimming mode signal Smod, so as to convert the digital type "0100 0000" into an analog type and output it as the control voltage Vco1, wherein the duty cycle to voltage converter 276 can include a digital-to-analog converter (DAC) for converting the digital type "0100 0000" into the analog type. Moreover, when the disperse delay unit 275 does not receive the output of the ADC 261, it can correspondingly generate a plurality of the control signals Sco1 to simultaneously conduct the switches SW1-SWn.

If the duty cycle of the dimming signal Sdim is 1/16, the ADC 261 outputs "0001 0000", and after the OR gate 262 operates the front three highest bits thereof, the dimming mode signal Smod with a low logic level is generated. Thereafter, the multiplexer 271 outputs "0001 0000" transmitted from the ADC 261 to the duty cycle to voltage converter 276 according to the dimming mode signal Smod. Now, the disperse delay unit 275 correspondingly generates a plurality of the control signals Sco1 to control the switches SW1-SWn to be respectively conducted during one period. Moreover, the disperse delay unit 275 regulates the output "0001 0000" of the ADC 261 according to the predetermined value, i.e. "0001 0000" is multiplied by 8 (which is equivalent to left-shift three bits) to obtain "1000 0000". Taking "1000 0000" as the gain signal, the duty cycle to voltage converter 276 converts "1000 0000" into an analog type and outputs it as the control voltage Vco1. It should be noticed that in the present embodiment, the duty cycle to voltage converter 276 does not receive the dimming signal Sdim, so as to reduce a complexity of a circuit design.

Figure 3A:
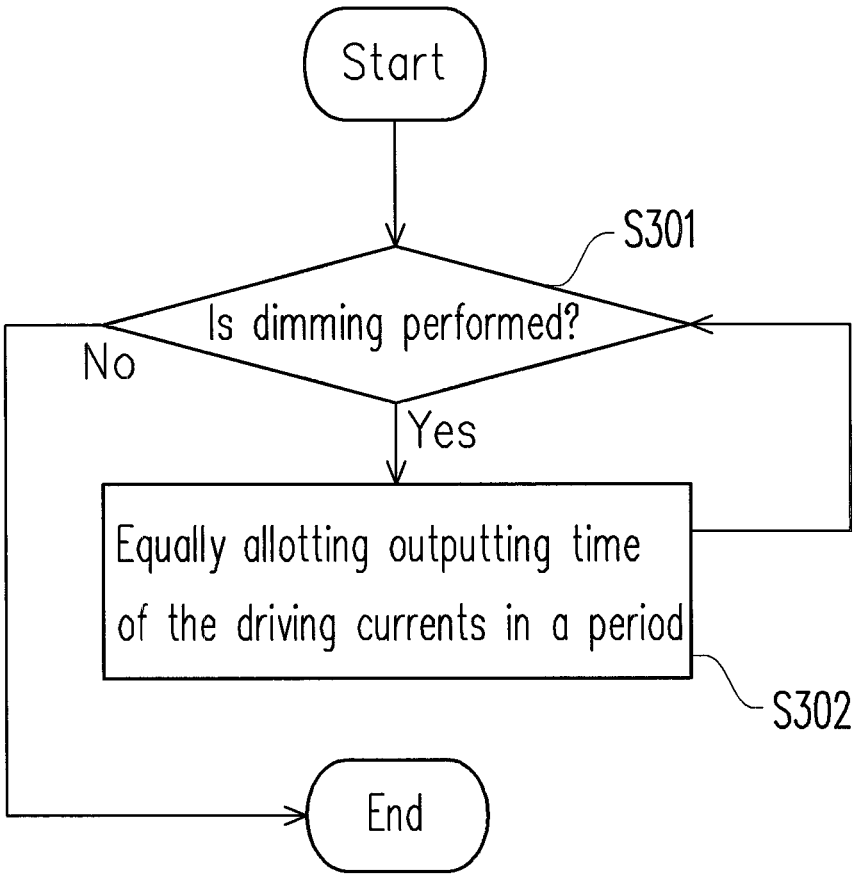
FIG. 3A is a flowchart illustrating a driving method according to an embodiment of the present invention.

According to the above description, a driving method for the driving apparatus 200 can be deduced. FIG. 3A is a flowchart illustrating a driving method according to an embodiment of the present invention. Referring to FIG. 2A and FIG. 3A, the driving apparatus 200 receives the dimming signal Sdim, and whether the driving apparatus 200 performs the dimming can be detected according to the dimming signal Sdim (step S301). When the driving apparatus 200 performs the dimming, the outputting time of the driving currents are equally allotted in a period (step S302), and the driving apparatus 200 can output the driving currents $I_1$-$I_n$ to respectively drive the LED strings 50_1-50_n. When the driving apparatus 200 does not perform the dimming, the driving method is ended.

Figure 3B:
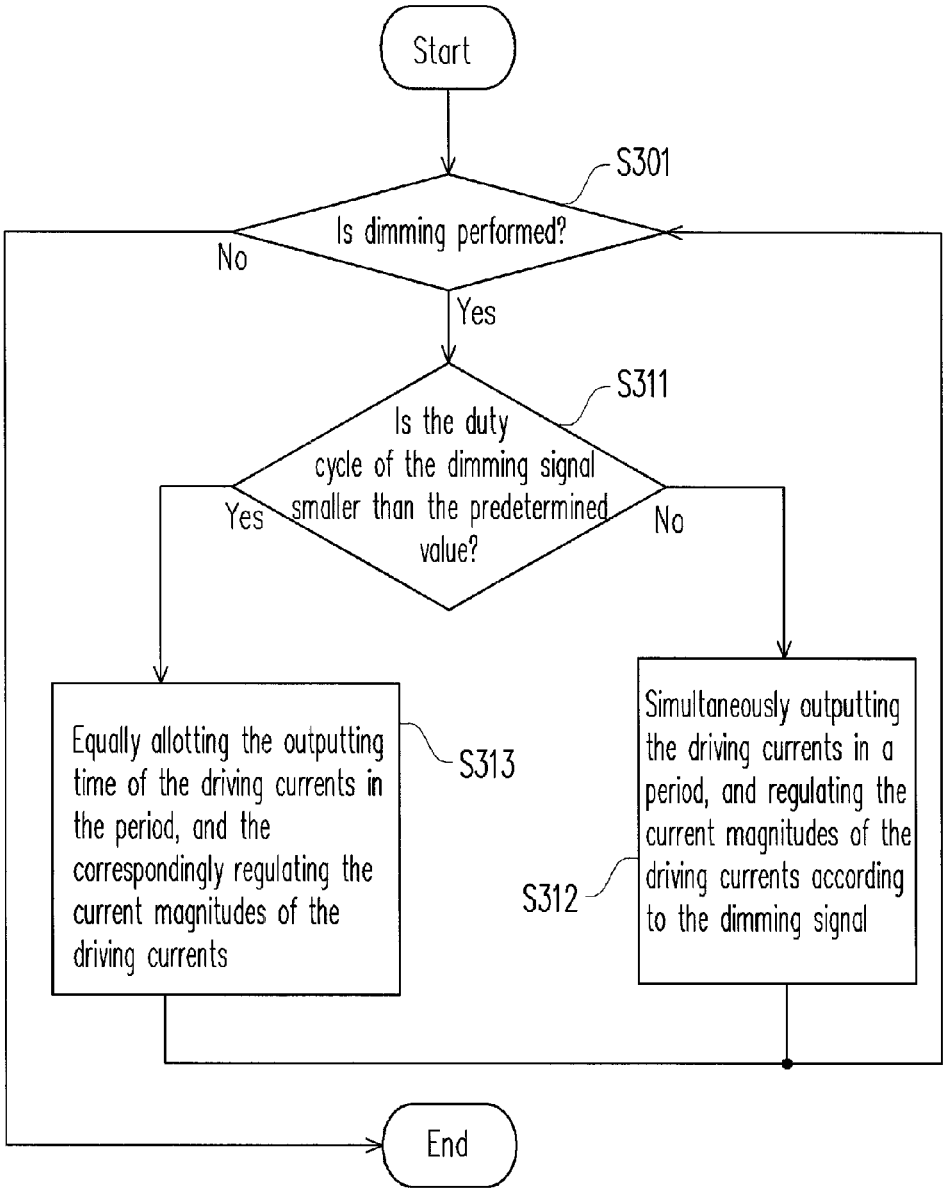
FIG. 3B is a flowchart illustrating a driving method according to another embodiment of the present invention.

FIG. 3B is a flowchart illustrating a driving method according to another embodiment of the present invention. Referring to FIG. 3A and FIG. 3B, a difference there between lies in steps S311, S312 and S313. When the driving apparatus performs the dimming, it is determined whether the duty cycle of the dimming signal is smaller than the predetermined value (step S311). If the duty cycle of the dimming signal is not smaller than the predetermined value, the driving currents are simultaneously output during the period, and the current magnitudes of the driving currents are regulated according to the dimming signal (step S312). If the duty cycle of the dimming signal is smaller than the predetermined value, the outputting time of the driving currents are equally allotted in the period, and the current magnitudes of the driving currents are correspondingly regulated (step S313). Wherein, the aforementioned embodiments can be referred for the steps S312 and S313, and therefore detailed descriptions thereof are not repeated.

In summary, according to the driving apparatus of the LED of the present invention and the driving method thereof, when the driving apparatus performs the dimming and the duty cycle of the dimming signal is smaller than the predetermined value, the outputting time of the driving currents are equally allotted in the period, and the current magnitude of each of the driving currents is correspondingly regulated. When the driving apparatus performs the dimming and the duty cycle of the dimming signal is equal to or greater than the predetermined value, the driving currents are simultaneously output in the period, and the current magnitude of each of the driving currents is regulated according to the dimming signal. By such means, the audio noise and the EMI caused by excessive variation of a sum of the driving currents are suppressed.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

[1. A driving method of a light-emitting diode (LED), adapted to a driving apparatus, the driving method comprising:

detecting whether the driving apparatus performs dimming;

if the driving apparatus is detected to perform dimming, determining whether a predetermined requirement for dimming control is met or not;

when the predetermined requirement for dimming control is not met, regulating respective current magnitudes of a plurality of driving currents, and outputting each of the driving currents for a full time of a period; and when the predetermined requirement for dimming control is met, outputting each of the driving currents for a partial time of a period.]

[2. The driving method of the LED as claimed in claim 1, wherein the driving method further comprises receiving a dimming signal, and the step of determining whether the predetermined requirement for dimming control is met or not is performed according to the dimming signal.]

[3. The driving method of the LED as claimed in claim 2, wherein the step of determining whether the predetermined requirement for dimming control is met or not according to the dimming signal comprises determining whether a duty cycle of the dimming signal is smaller than a predetermined value or not.]

[4. The driving method of the LED as claimed in claim 1, wherein in a situation where the predetermined requirement for dimming control is not met, the respective current magnitudes of the plurality of driving currents are regulated according to the dimming signal.]

[5. The driving method of the LED as claimed in claim 4, wherein in the situation where the predetermined requirement for dimming control is not met, the respective current magnitudes of the plurality of driving currents are determined according to the duty cycle of the dimming signal.]

[6. The driving method of the LED as claimed in claim 1, further comprising:

in a situation where the predetermined requirement for dimming control is met, arranging a respective current magnitude and a respective outputting time of each of the driving currents in a period according to the dimming signal.]

[7. The driving method of the LED as claimed in claim 6, wherein in the situation where the predetermined requirement for dimming control is met, the respective current magnitude and the respective outputting time of each of the driving currents in the period are determined according to the duty cycle of the dimming signal.]

[8. The driving method of the LED as claimed in claim 1, further comprising: regardless of whether each of the driving currents is output for the full time or the partial time of the period, maintaining a sum of the driving currents calculated for a period approximately to a fixed value for a same duty cycle of the dimming signal.]

[9. A driving method of a light-emitting diode (LED), adapted to a driving apparatus, the driving method comprising:

receiving a dimming signal;

detecting whether the driving apparatus performs dimming;

if the driving apparatus is detected to perform dimming, regulating at least one of a respective current magnitude and a respective outputting time of each of a plurality of driving currents in a period according to a duty cycle of the dimming signal, such that a sum of the driving currents calculated for a period is substantially proportional to the duty cycle of the dimming signal.]

[10. The driving method of the LED as claimed in claim 9, wherein in at least one of the regulations, only the respective current magnitude of each of the driving currents is regulated according to the duty cycle of the dimming signal, and in at least another one of the regulations, both the respective current magnitude and the outputting time of each of the driving currents in the period are regulated according to the duty cycle of the dimming signal.]

[11. The driving method of the LED as claimed in claim 9, wherein in at least one of the regulations, each of the driving currents is output for a full time of the period, and in at least another one of the regulations, each of the driving currents is output for a partial time of the period.]

[12. The driving method of the LED as claimed in claim 11, wherein whether each of the driving currents is output for the partial time of the period or the full time of the period is determined according to whether the duty cycle of the dimming signal is smaller than a predetermined value or not.]

[13. The driving method of the LED as claimed in claim 11, wherein for the regulations for a same duty cycle of the dimming signal, regardless of whether each of the driving currents is output for the full time or the partial time of the period, a sum of the driving currents calculated for the period is substantially maintained to a fixed value.]

14. A driving circuit for driving a plurality of light-emitting diodes (LEDs), the driving circuit comprising:

a plurality of switches, used to be coupled to the LEDs;

a dimming detector, for receiving a dimming signal and outputting a dimming mode signal according to the dimming signal;

a current control unit, for outputting a plurality of control signals according to the dimming mode signal and the dimming signal, wherein the control signals respectively control conducting states of the switches,

*wherein the driving circuit further comprises a current driving unit coupled between the switches and the current control unit, and the current control unit further outputs a control voltage according to the dimming mode signal and the dimming signal, wherein the control voltage controls the current driving unit to regulate a plurality of driving currents for driving the LEDs.*

[15. The driving circuit as claimed in claim 14, wherein the driving circuit further comprises a current driving unit coupled between the switches and the current control unit, and the current control unit further outputs a control voltage according to the dimming mode signal and the dimming signal, wherein the control voltage controls the current driving unit to regulate a plurality of driving currents for driving the LEDs.]

16. The driving circuit as claimed in claim 14, wherein the dimming detector detects whether dimming is performed according to the dimming signal and outputs the dimming mode signal according to the detection result.

17. The driving circuit as claimed in claim 16, wherein the dimming detector detects whether dimming is performed by detecting a duty cycle of the dimming signal.

18. The driving circuit as claimed in claim 16, wherein the dimming detector further detects whether a duty cycle of the dimming signal is smaller than a predetermined value or not so as to output the dimming mode signal to the current control unit for arranging the status of the switches.

19. [The driving circuit as claimed in claim 18, wherein] *A driving circuit for driving a plurality of light-emitting diodes (LEDs), the driving circuit comprising:*

*a plurality of switches, used to be coupled to the LEDs;*

*a dimming detector, for receiving a dimming signal and outputting a dimming mode signal according to the dimming signal;*

*a current control unit, for outputting a plurality of control signals according to the dimming mode signal and the dimming signal, wherein the control signals respectively control conducting states of the switches,*

*wherein the dimming detector detects whether dimming is performed according to the dimming signal and outputs the dimming mode signal according to the detection result, the dimming detector further detects whether a duty cycle of the dimming signal is smaller than a predetermined value or not so as to output the dimming mode signal to the current control unit for arranging the status of the switches, and* the dimming detector detects whether the duty cycle of the dimming signal is smaller than the predetermined value or not so as to further output the dimming signal to the current control unit, such that the current control unit controls the current driving unit to regulate driving currents for driving the LEDs.

20. The driving circuit as claimed in claim 18, wherein in a situation where the dimming detector detects that dimming is performed and the duty cycle of the dimming signal is smaller than the predetermined value, the current control unit outputs the control signals to control the switches to be conducted for a partial time of a period.

21. The driving circuit as claimed in claim 18, wherein in a situation where the dimming detector detects that dimming is performed and the duty cycle of the dimming signal [is the duty cycle of the dimming signal] is not smaller than the predetermined value, the current control unit outputs the control signals to control each of the switches to be conducted for a full time of a period.

22. The driving circuit as claimed in claim 19, wherein in a situation where the dimming detector detects that dimming is performed and the duty cycle of the dimming signal [is the duty cycle of the dimming signal] is smaller than the predetermined value, the current control unit outputs the control signals to control each of the switches to be conducted for a partial time of a period.

23. The driving circuit as claimed in claim 19, regardless of whether a duty cycle of the dimming signal is smaller than the predetermined value or not, the driving currents are regulated such that a sum of the driving currents calculated for the period is substantially proportional to the duty cycle of the dimming signal.

[24. An electronic device, comprising the driving circuit as claimed in claims 14; and a plurality of light-emitting diodes coupled to and driven by the driving circuit.]

*25. A driving circuit for driving a plurality of light-emitting diodes (LEDs), the driving circuit comprising:*

*a plurality of switches, coupled to the LEDs;*

*a dimming detector, receiving a dimming signal and detecting a dimming control; and*

*a current control unit, coupled to the dimming detector, and responsive to a detection of the dimming control to output a plurality of control signals, wherein the control signals respectively control conducting states of the switches,*

*wherein the driving circuit further comprises a current driving unit coupled between the switches and the current control unit, the current control unit further outputs a control voltage in response to the detection of the dimming control, and the control voltage controls the current driving unit to regulate a plurality of driving currents for driving the LEDs.*

*26. The driving circuit as claimed in claim 25, wherein the current control unit controls the conducting state of each of the switches for a partial time of a period.*

*27. The driving circuit as claimed in claim 26, wherein conducting times of the switches are substantially equal to each other.*

*28. The driving circuit as claimed in claim 26, wherein conducting times of any two of the switches are not overlapped.*

*29. The driving circuit as claimed in claim 26, wherein the driving currents flowing through the switches are substantially equal to each other.*

*30. The driving circuit as claimed in claim 29, wherein a sum of current magnitudes of the driving currents flowing through the switches is substantially constant over the period.*

*31. The driving circuit as claimed in claim 25, wherein the dimming detector further detects a predetermined condition according to the dimming signal for determining ways of the dimming control.*

*32. The driving circuit as claimed in claim 31, wherein the dimming detector detects the predetermined condition by detecting a duty cycle of the dimming signal.*

*33. The driving circuit as claimed in claim 32, wherein the current control unit arranges the conducting states of the switches according to detection result of the predetermined condition.*

*34. The driving circuit as claimed in claim 33, wherein the current control unit controls the current driving unit to regulate the driving currents for driving the LEDs according to the detection result of the predetermined condition.*

*35. The driving circuit as claimed in claim 33, wherein when a first predetermined condition is detected, the current control unit outputs the control signals to control the switches to be conducted for a partial time of a period.*

*36. The driving circuit as claimed in claim 35, wherein when a second predetermined condition is detected, the current control unit outputs the control signals to control each of the switches to be conducted for a full time of a period.*

*37. The driving circuit as claimed in claim 36, regardless of the first predetermined condition or the second predetermined condition is detected, the driving currents are regulated such that a sum of the driving currents calculated for the period is substantially proportional to the duty cycle of the dimming signal.*

* * * * *